No. 779,741. PATENTED JAN. 10, 1905.
H. J. SCHEUBNER.
FEED WATER HEATER.
APPLICATION FILED JUNE 10, 1904.
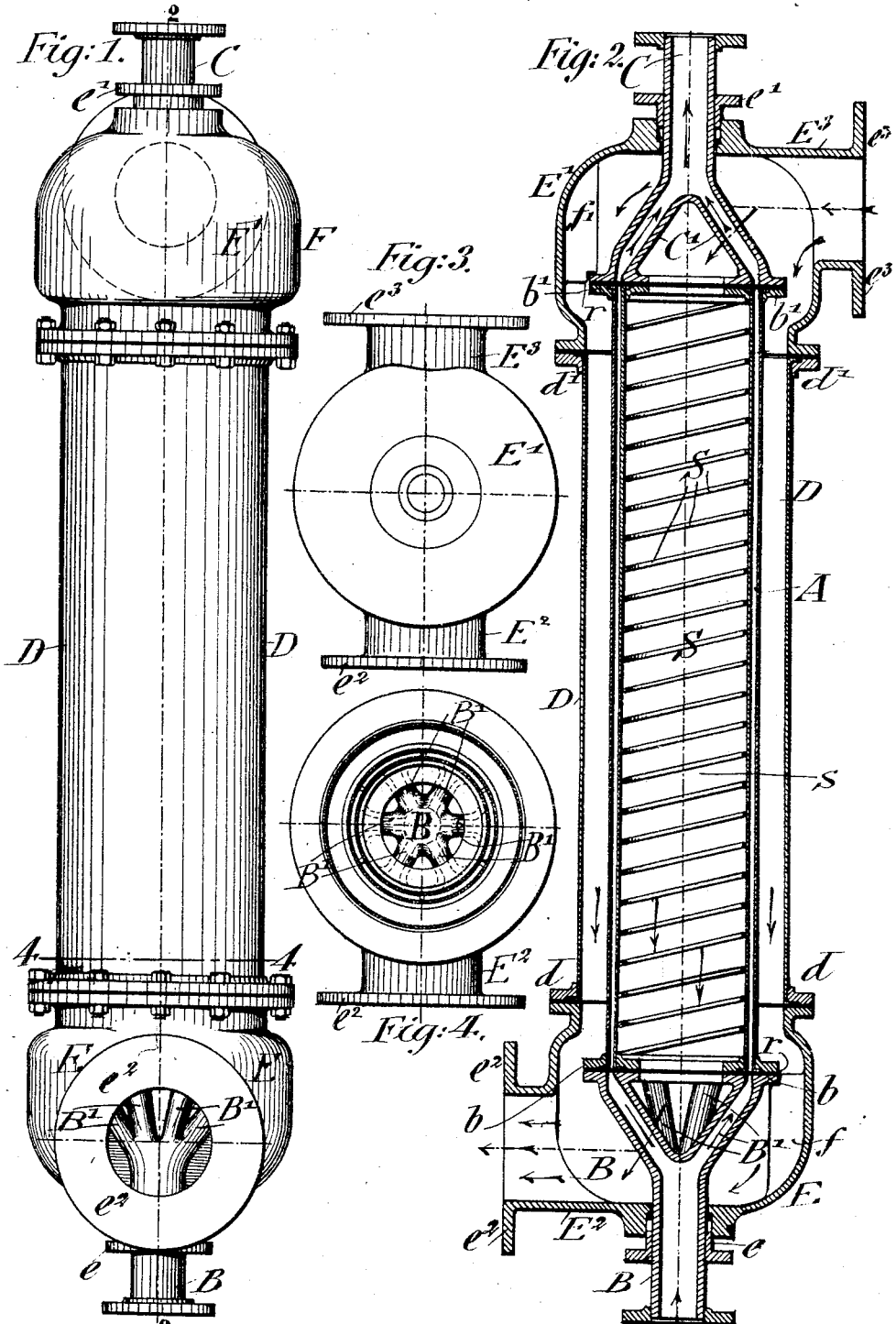
Witnesses
Inventor
Herman J. Scheubner
By his Attorneys No. 779,741.

Patented January 10, 1905.

UNITED STATES PATENT OFFICE.

HERMAN J. SCHEUBNER, OF NEW YORK, N. Y.

FEED-WATER HEATER.

SPECIFICATION forming part of Letters Patent No. 779,741, dated January 10, 1905.

Application filed June 10, 1904. Serial No. 211,891.

*To all whom it may concern:*

Be it known that I, HERMAN J. SCHEUBNER, a citizen of the United States, residing in New York, borough of Manhattan, in the State of New York, have invented certain new and useful Improvements in Feed-Water Heaters, of which the following is a specification.

This invention relates to an improved feed-water heater of that class in which the feed-water is passed in a comparatively thin sheet in opposite direction to an interior and exterior current of steam, and more especially exhaust-steam, so as to be heated in a very effective and reliable manner; and the invention consists of a feed-water heater which comprises an interior double-walled tubular body connected at its lower and upper ends with water supply and delivery pipes, said tubular body being surrounded by an exterior body provided with an inlet and an outlet head for the exhaust-steam, the inner shell of the double-walled tubular body being reinforced by a helical spring for the purpose of equalizing the expansion and contraction of the inner shell of the tubular body, as will be fully described hereinafter and finally pointed out in the claims.

In the accompanying drawings, Figure 1 is a front elevation of my improved feed-water heater. Fig. 2 is a vertical transverse section on line 2 2, Fig. 1. Fig 3 is a plan view of Fig. 1; and Fig. 4 is a horizontal section on line 4 4, Fig. 1.

Similar letters of reference indicate corresponding parts throughout the several views.

Referring to the drawings, A designates an interior double-walled tubular body, preferably of cylindrical shape, which is connected at its lower and upper ends with water supply and delivery tubes B and C, respectively, which are provided with a number of branch pipes $B'$ $C'$ for delivering the water uniformly to the double-walled body A. The inner and outer walls or shells of the tubular body A are preferably made of copper and provided with bent-up flanges at their lower and upper ends, so as to be brazed or otherwise connected to rings $b$ $b'$, as shown clearly in Fig. 2. The supporting-rings are riveted to the circular flanges of the branched ends $B'$ $C'$ of the supply and delivery tubes B and C, so as to form an absolutely-tight connection with the same, the branched supply and delivery tubes being preferably made of cast metal.

The double-walled body A is surrounded by an exterior shell, preferably of sheet-copper or other suitable material, which is brazed at the upper and lower ends to rings $d$ $d'$, that are riveted, bolted, or otherwise connected to the outwardly-bent flanges of heads E E', said heads being connected, by means of stuffing-boxes $e$ $e'$, with the supply and delivery pipes B and C, respectively, and provided with tubular portions $E^2$ $E^3$, flanged at their outer ends $e^2$ $e^3$, said tubular portions extending in diametrically opposite directions to each other. The upper tubular portion $E^3$ is connected with the exhaust-pipe from a steam-engine or other source of exhaust-steam, while the lower portion $E^2$ is connected with a tube for conducting off the non-condensed exhaust-steam and the water of condensation. The heads E E', with their tubular portions $E^2$ $E^3$, are preferably made of suitable cast metal, the heads being provided at their interior with inwardly-projecting ribs or stays $f$ $f'$, which are recessed, respectively, at their upper and lower corners, as shown at $r$, so as to form a support for the flanged ends of the branched supply and delivery pipes $B'$ $C'$, as shown clearly in Fig. 2.

At the interior of the inner shell of the tubular body A is arranged a helical spring S, which is of sufficient strength to effectively reinforce the inner tubular shell of the double-walled body A and to take up the pressure of the feed-water as it is gradually heated in its upward passage between the inner and outer walls of the body A, so as to prevent the collapsing of the same by the expansion of the feed-water under the influence of the heat of the exhaust-steam that is passing through between the branched delivery-tubes $C'$, the space $S'$ at the interior of the inner shell, and from the annular space between the outer wall of the double-walled body A and the exterior shell D to the tubular outlet portion $E^2$.

As the amount of water in the double-walled body is comparatively small, while the interior and exterior channels through which the exhaust-steam is conducted in opposite direction to the direction of the water is comparatively large, an effective and quick heating action is exerted on the feed-water passed between the walls of said double-walled body, so that the exhaust-steam is utilized effectively for the heating up of the feed-water, the transferring of the heat of the same to the water taking place on the surface of the inner and outer shells of the double-walled body and on the surface of the branch pipes B' C' in an effective manner, while the collapsing of the interior shell under the expansion of the quickly-heated water passing through the double-walled body is neutralized by the pressure of the reinforcing-spring, which allows for the unequal expansion and contraction of the inner shell and enables it thereby to neutralize unequal pressure due to the expansion of the water that is being heated in its passage upward between the walls of the body A.

Having thus described my invention, I claim as new and desire to secure by Letters Patent—

1. A feed-water heater, comprising an upright tubular shell, heads attached to either end of said shell, each being provided with a lateral opening, a double-walled body supported at the interior of said shell, and supply and discharge pipes passing vertically through said heads and having inclined radiating branch pipes communicating with the space between the walls of said double-walled body, said branch pipes being disposed within said heads.

2. A feed-water heater, comprising an upright tubular shell, heads attached to either end of said shell, each being provided with a lateral opening, a double-walled body supported at the interior of said shell, supply and discharge pipes passing through said heads, and stuffing-boxes at the juncture of said pipes and said heads, said supply and discharge pipes being in communication with the space between the walls of said double-walled body.

In testimony that I claim the foregoing as my invention I have signed my name in presence of two subscribing witnesses.

HERMAN J. SCHEUBNER.

Witnesses:
CHARLES F. ONASCH,
GEORGE CRAMER.